US005227603A

United States Patent [19]

Doolette et al.

[11] Patent Number: 5,227,603

[45] Date of Patent: Jul. 13, 1993

[54] ELECTRIC ARC GENERATING DEVICE HAVING THREE ELECTRODES

[75] Inventors: Ashley G. Doolette, Thornbury; Walter T. Oppenlander, Greensborough; Subramania Ramakrishnan, Glen Waverly, all of Australia

[73] Assignees: Commonwealth Scientific & Industrial Research Organisation, Campbell; Siddons Ramset Limited, Victoria, both of Australia

[21] Appl. No.: 663,916

[22] PCT Filed: Sep. 13, 1989

[86] PCT No.: PCT/AU89/00396

§ 371 Date: May 7, 1991

§ 102(e) Date: May 7, 1991

[87] PCT Pub. No.: WO90/03095

PCT Pub. Date: Mar. 22, 1990

[51] Int. Cl.[5] .......... B23K 9/00

[52] U.S. Cl. .......... 219/121.59; 219/121.52; 219/121.57; 219/121.48

[58] Field of Search .......... 219/121.59, 121.52, 219/121.48, 121.54, 121.55, 121.57, 75

[56] References Cited

U.S. PATENT DOCUMENTS

| | | | |
|---|---|---|---|
| 3,309,550 | 3/1967 | Wolf et al. | 219/121.39 |
| 4,625,092 | 11/1986 | Camacho et al. | 219/121.48 |
| 4,780,591 | 10/1988 | Bernecki et al. | 219/121.52 |
| 4,788,408 | 11/1988 | Wlodwczyk et al. | 219/121.49 |
| 5,070,227 | 12/1991 | Luo et al. | 219/121.55 |

*Primary Examiner*—Mark H. Paschall

*Attorney, Agent, or Firm*—Edward S. Irons

[57] ABSTRACT

An electric arc generating device including, a first electrode and at least two further electrodes. A source of electrical power is connected to said electrodes so as to cause an arc to burn between the first electrode and one of the further electrodes. The distribution of power within the zone of the arc is controlled by repetitively changing the path of the arc. That is, one root of the arc may remain attached to the first electrode, whereas attachment of the other root is transferred between two or more of the further electrodes on a repetitive basis. The timing and extent of each change may vary according to circumstances of use. The changes in arc path are due at least in part to repetitive modification of the influence of the power source on one or more of the further electrodes, but variation of the flow rate of gas/material through the arc zone can be another controlling factor.

15 Claims, 3 Drawing Sheets

ELECTRIC ARC GENERATING DEVICE HAVING THREE ELECTRODES

This invention is concerned with the generation of electric arcs and is particularly although not exclusively concerned with plasma torches for spraying, arc heaters and arc furnaces.

In the context of this specification, an electric arc is to be understood as an electric discharge in a gaseous medium sustained between spaced electrodes by the passage of relatively large currents and characterised by low voltage drops at the cathode. The properties of the electric arc are influenced by a number of parameters such as the arc current, the fluid dynamics, the containment, the electrode material temperature and shape, the external magnetic fields (if used), and the gas in which the arc burns.

The gas in an electric arc attains very high temperatures (6,000–30,000 K) and for that reason electric arcs have been proposed for use in a variety of industrial processes and applications which require very high temperatures. In many applications, an electric arc at a current of hundreds of amperes is allowed to burn between two electrodes within a chamber which may be identified as a plasma torch, or an arc heater, or an arc reactor. Gas of suitable composition is forced to flow through the arc region of the heater so that the thermal energy liberated by the arc is transferred to the gas to produce a high-temperature gas stream at the exit of the arc heater. This high-temperature gas produced by the arc heater can be used for the treatment of materials at high temperatures or the treatment of surfaces. U.S. Pat. No. 3,832,519 (Westinghouse) is directed to an electric arc reactor which has been considered useful in the destruction of hazardous waste at high temperatures. The APG ("NOVA") advanced plasma gun developed by Metco and which is the subject of U.S. Pat. No. 4,780,591, is another example of an arc heater used for melting and spraying of powders.

In some applications related to material treatment using an electric arc, the material to be treated is injected into the region of the electric arc within an arc reactor to increase the resident time of the material in a high-temperature environment. Patent application PCT/AU89/00216 entitled "Electric Arc Reactor" describes a method of injecting material into the core of an electric arc.

Effective and broad ranging control of arc power is important in devices such as plasma spraying torches, arc heaters and arc reactors for material treatment to attain high process efficiency and quality. The ability to select any of a variety of methods and location of material feed is also important, but the majority of prior devices only provide for injection of material near the exit of the device and therefore away from a location at which direct interaction with the arc would be possible. If material is fed in such a way that interaction of the material with the electric arc takes place, then a control of the power distribution within the arc region is important. That will also apply when the material is fed further downstream into the arc flame.

In prior devices, the main method of control of arc power is achieved by operating the arc at different levels of arc current and/or by changing the composition and the flow rate of the gas in which the arc burns. A consequence of these variations may result in a change of the arc length in a few devices, but such a change is generally small. In a device such as the APG plasma gun of Metco, the main control parameter is the arc length which is effected by moving mechanically one of the electrodes of the arc with respect to the other while maintaining the arc current to be the same. Arc heaters have also been proposed in which arc lengthening is achieved by the use of electrical switches during the start-up of the heater, and an example of such a heater is the well known Tioxide torch. Systems with multiple arcs operated from different supplies have been proposed with the main intention of distributing the arc activity over a larger volume for material injection into the arc. Apart from the APG plasma gun of Metco, all prior devices do not provide a large range of operating power level and sufficient flexibility of control. Although the APG plasma gun allows the possibility of greater adjustment of arc power, that adjustment is of a mechanical nature and cannot be carried out quickly.

It is an object of the present invention to provide a device of the foregoing kind which permits a substantial degree of control over arc power without the use of mechanical movement. It is a further object of the invention to provide such a device which has the capacity for rapid variation of arc power and power distribution. Other objects and advantages of the invention will be apparent from the following detailed description of a particular embodiment of the invention.

The invention also contemplates an improved method of treating material by controlling the interaction of the material with or influence by an electric arc, and the nature of that method, in its various possible forms, will be apparent from the following description.

In accordance with one aspect of the present invention, there is provided an electric arc generating device including, a first electrode, at least two further electrodes, supply means for connecting an electrical power source between said first electrode and any one or more of said further electrodes so as to cause an arc to be generated between said first electrode and a said further electrode, and control means which is operative to change the path of said arc between said first electrode and said further electrodes and thereby control the distribution of power within the arc zone, said change in arc path involving a series of changes in the length of the arc which includes both extension and reduction of the arc length, said control means including electrical means which imposes an electrical influence on said arc path.

It is to be understood that prevailing circumstances will dictate whether the changes in arc length which occur with any series of such changes, are frequent or otherwise, and whether any individual change is an extension or a reduction. There need not be consistency in the timing or the extent of each change in arc length. The time and extent of each change will be according to the demands of the circumstances of use of the device, and the pattern and nature of the changes which occur over a period of time might be quite irregular.

In accordance with another aspect of the invention, there is provided a method of operating an electric arc generating device having a first electrode and at least two further electrodes, including the steps of connecting an electrical power source to said electrodes so as to cause an arc to be generated between the first electrode and one of said further electrodes, controlling the distribution of power within said arc by causing a series of changes in the length of the arc, and at least contributing to said control by said series including both extension and reduction of the arc length, modifying the influence of said power source on one or more of said further electrodes.

A device according to the invention is characterised in that the electric arc can be generated between different electrodes within a group of three or more electrodes. In one arrangement, for example, one electrode forms the cathode and there are two or more anodes which are individually controllable electrically as required. The fundamental feature of the invention is the use of three or more electrodes and controlled activation of those electrodes in such a way that the path and the distribution of the electric current flowing from the electric arc to the external power source are varied to control the total arc power and its distribution within the electric arc.

It is another characteristic of a device according to a preferred form of the invention that gases and material such as powders and liquids, can be fed into the arc or the region of the arc in various ways and at various locations. Such feed may involve directing material laterally into the arc column at a location between the ends of that column, and that can be effected through passageways provided between the electrodes. Alternatively or additionally, material may be introduced into the device at either end of the arc, and the direction of introduction can be lateral or axial. Such versatility of the device enables full advantage to be taken of the controllable power distribution.

Embodiments of the invention are described in detail in the following passages of the specificaton which refer to the accompanying drawings. The drawings, however, are merely illustrative of how the invention might be put into effect, so that the specific form and arrangement of the various features as shown is not to be understood as limiting on the invention.

Figure 1:
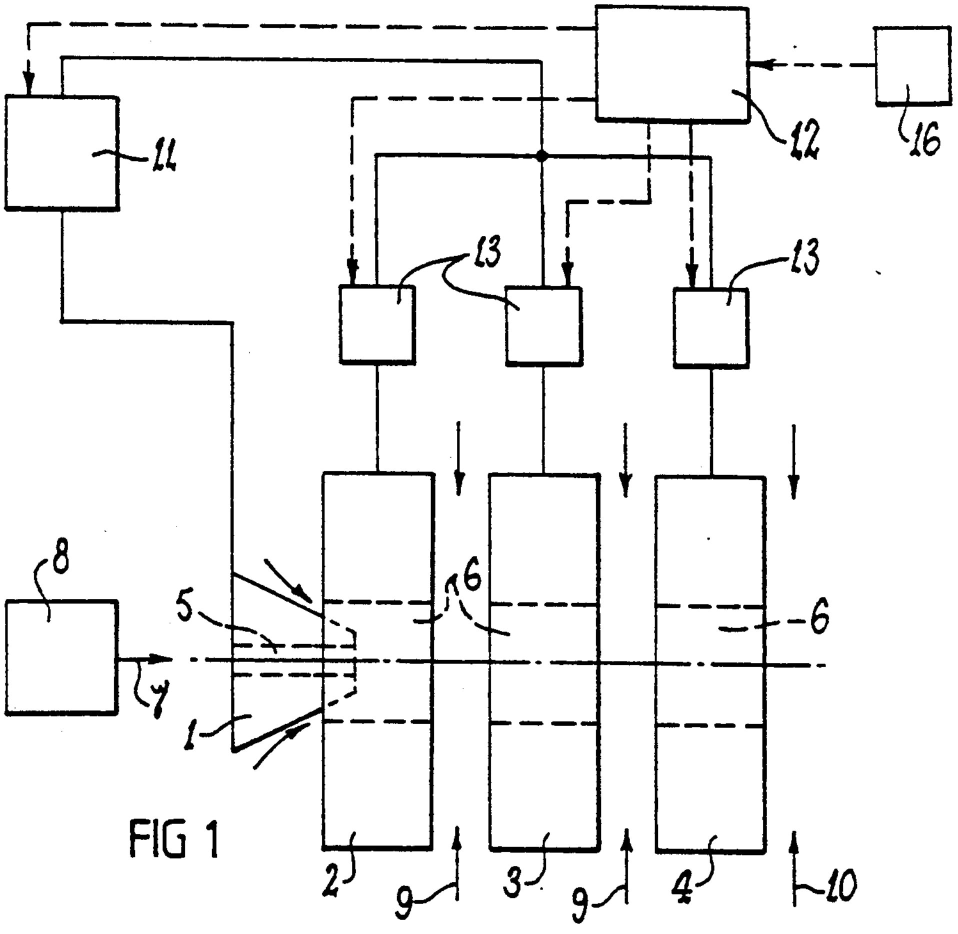
FIG. 1 is a diagramatic representation of one embodiment of the invention.

The device of FIG. 1 includes a core electrode 1 which, by way of example, functions as a cathode and is of generally conical form, and two or more annular ring electrodes 2, 3 and 4, each of which has the potential to function as an anode in the particular example shown. The electrodes 1, 2, 3 and 4 are arranged in substantially coaxial relationship as shown and the ring electrodes 2, 3 and 4 are arranged in axially spaced relationship. The core electrode 1 could be axially spaced from the nearest ring electrode 2, but in the example shown, it intrudes into the ring electrode 2. It is possible that one of the electrodes of the device is a consumable electrode in the form of wire, for example, which is replenished by a suitable electrode-feeding system.

Appropriate cooling means can be provided for each of the electrodes 1 to 4.

It is to be understood that the form and arrangement of each electrode could be different to that shown in FIG. 1. For example, the core electrode 1 could be of rod-like form and contain a cavity as described in patent application PCT/AU89/00216 entitled "Electric Arc Reactor". In that regard, the disclosure of the specification of that earlier application is to be understood as being imported by cross reference into the present specification. Alternatively, the electrode 1 could be a ring electrode. Any configuration of electrodes which permits changing of the arc path and employment of suitable gas/material flow, could be adopted.

An axial feed passage 5 is shown extending through the core electrode 1 of the FIG. 1 device. That passage 5 can be used to inject gas and/or other material into and through the central openings 6 of the ring electrodes 2, 3 and 4. The arrow 7 represents feed of gas and/or other material into the passage 5, and the block 8 represents means which may be provided to permit regulation of the rate of flow of gas and/or other material into the passage 5.

Feed passages for gas and/or other material may be provided between any two adjacent electrodes 2, 3 and 4, and the arrows 9 represent the feed of material into such passages. Those passages may be additional to, or alternative to, the passage 5, and it will be convenient to hereinafter refer to those passages as lateral feed passages. Gas and/or other material can also be introduced into the device at a location beyond the last ring electrode 4 in the group as is represented by arrows 10. Gas fed into the device at a location before the last ring electrode 4 emerges as a jet from the central opening of that electrode 4.

If desired, passive spacers may be located between each two adjacent ring electrodes, in which event the aforementioned lateral feed passages may be formed through such spacers.

The gas composition to be used with the device may vary according to the use application of the device, but could be argon, nitrogen, air, or any mixture of inert and reactive gases. The material from which the electrodes are made will need to be selected to suit the circumstances of use. Different gases or combinations of gases can be used at each injection or feed introduction point as referred to above. In the case of lateral injection of gas, it is generally preferred that the injection be substantially uniform around the axis of the device and in a direction having a tangential component so as to induce swirl in the gas stream. That swirl characteristic tends to cause the point of attachment between the arc and each electrode to rotate about the relevant surface of the electrode, thereby reducing localised heating and erosion of the electrode. The swirling action also assists in stabilising the arc column and mixing of the injected material and its interaction with the arc.

If desired, the device may include means whereby an axial magnetic field can be generated so as to assist the rotation of the points of arc attachment to the electrodes.

Material to be treated by the device can be of any suitable form. For example, that material can be in the form of wire or the like, solid particles or liquid droplets, and in either case the material can be introduced suspended in a gas stream introduced at any one of the injection points referred to above. Injection into the arc can be achieved in the manner described in the cross referenced patent application PCT/AU89/00216. Furthermore, the type and form of the material can be different at each injection point.

An appropriate power source 11 is provided to enable the activation of the electrodes as shown diagrammatically in FIG. 1 and control means 12 is provided for controlling individually the current drawn by the electrodes 2, 3 and 4. In the FIG. 1 arrangement, the control means 12 includes means for controlling the power source 11 and further means for controlling a number of current control elements 13, each of which is connected to a respective one of the ring electrodes 2, 3 and 4. The current control element 13 connected to each ring electrode 2, 3 and 4 can be in the form of passive circuit components such as resistors and inductors, or active power electronic circuit elements such as transistors, or any combination of these elements. An important advantage of the arrangement shown is that the control elements 13 connected to the ring electrodes 2, 3 and 4 are controlled in such a way that the current flowing in each of the individual element 2, 3 and 4 is adjusted to yield a desired current distribution and hence a power distribution in the device. The power source 11 may be a constant-current type power source to maintain the required overall current through the device, or the source may be suitably controlled to give an optimum overall power. The ring electrodes 2, 3 and 4 may be operated as cathodes or anodes of the electric arc by connecting them to either the negative or the positive terminal of the power source 11.

In the power/control circuit of FIG. 1, and other Figures of the drawings, the unbroken lines are representative of the current path whereas the broken lines are representative of control paths.

Figure 2:
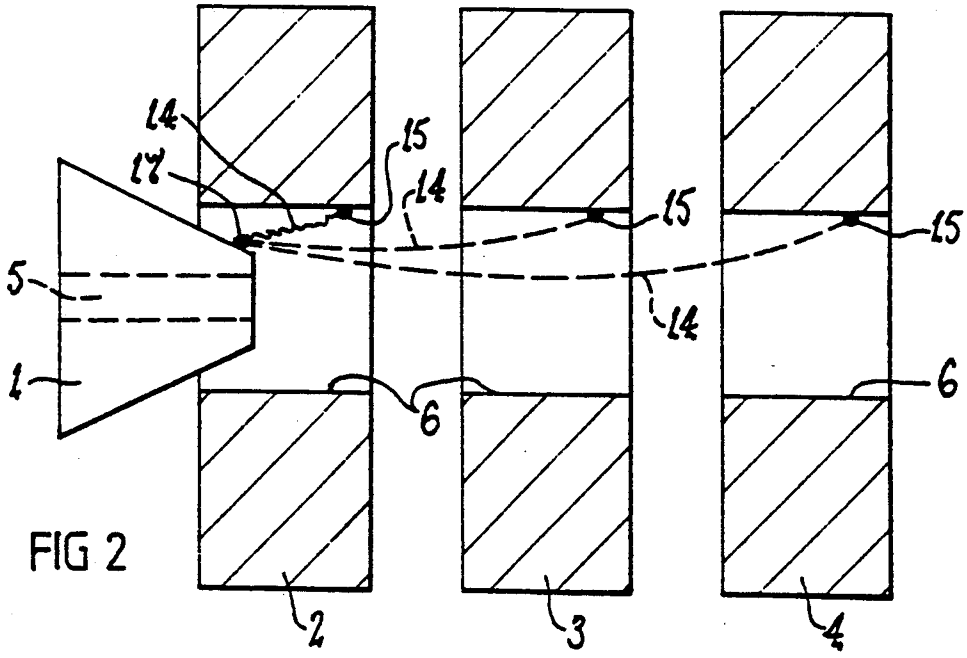
FIG. 2 is a diagrammatic representation based on FIG. 1 showing changes in the arc path.

FIG. 2 shows, in diagrammatic form, the consequences of the control system shown in FIG. 1. Initially, an arc 14 may be generated between the electrodes 1 and 2, and suitable operation of the control means 12 can create a change in the electrical influence on the arc 14 such that its path is shifted. In particular, the downstream root 15 of the arc 14 can be caused to shift from the electrode 2 to the electrode 3, and subsequently to the electrode 4 if desired. The extent of the arc path is thereby changed as shown in broken line in FIG. 2.

By suitable operation of the control means 12, it is possible to rapidly change the arc path by producing a series of changes in the arc length, which involves both extension and reduction of that length, and thereby effectively control the power and power density distribution within the electrical arc device. That power distribution may be controlled in terms of space (extent of influence) and/or time (frequency and timing of change). In some circumstances, it may be desired to maintain a predetermined level of power and/or extent of distribution over a period of time, and that can be achieved by causing successive changes in the arc path to compensate for changes in power level and/or distribution which would otherwise occur.

Suitable control parameters may be imposed on the control means 12 through a suitable source 16 as shown diagrammatically in FIG. 1.

Change in arc path need not be controlled solely by electrical influence as described above. The rate of flow of gas and/or material through the device, and particularly through the zone of the arc 14, can have an influence on the extent of the arc. Consequently, variation of that flow rate can be a factor in controlling changes in the arc path. In regard, the flow rate can be adjusted by operation of the regulator means 8 (FIG. 1). That same means 8, or similar means, can be used to regulate the flow rate at the material feeds 9 and 10.

It is to be understood that the change in arc path can be sudden or progressive according to requirements. In the latter case, it may happen that the arc 14 is split, at least temporarily, so as to have two paths. For example, one path of the split arc may extend to the electrode 2 and the other path may extend to the electrode 3. That is, there will be two downstream root attachments 15 which are spaced apart in the axial direction of the device, and a single upstream root attachment 17 (FIG. 2).

Figure 3:
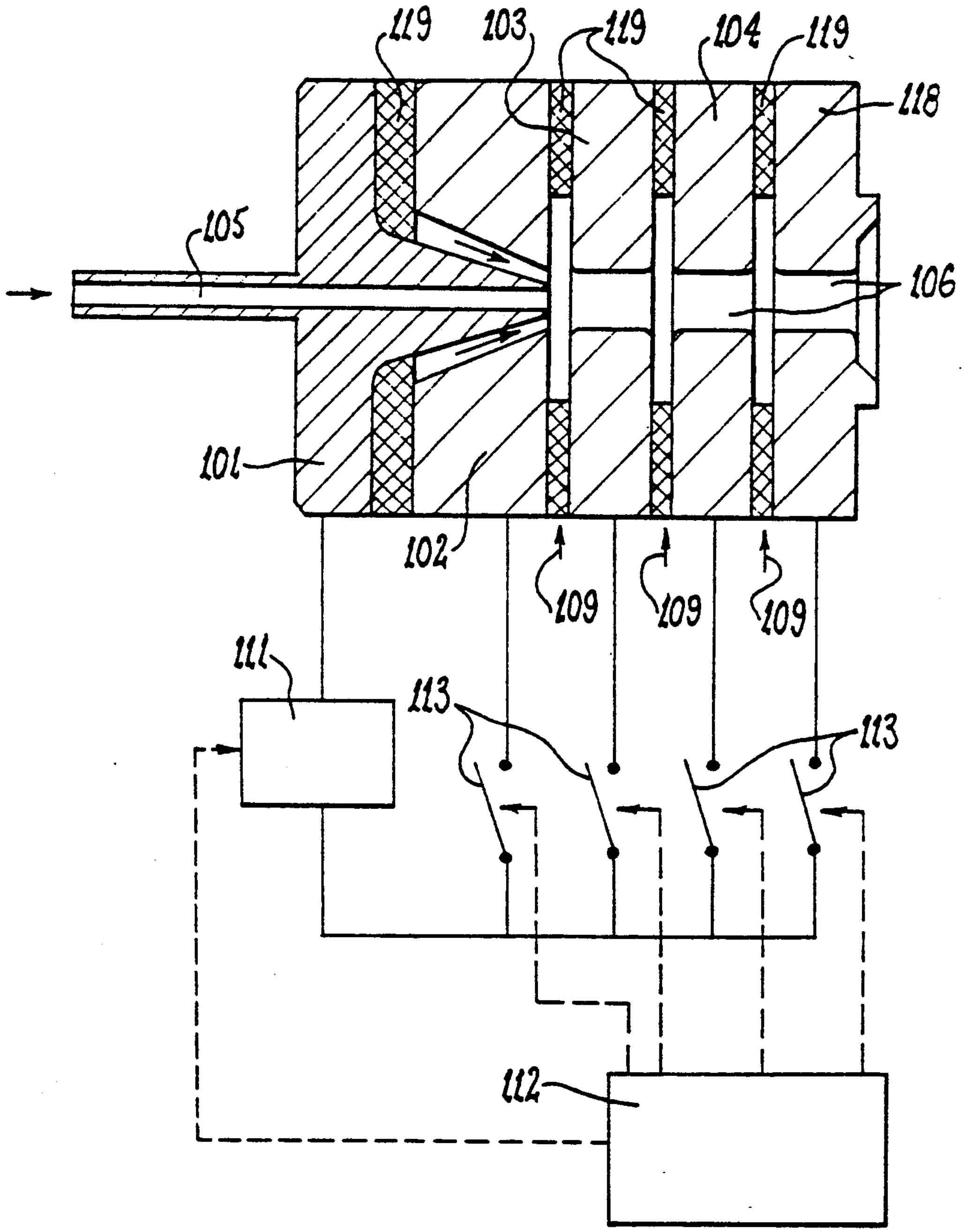
FIG. 3 is a diagrammatic representation of another embodiment of the invention.

FIG. 3 shows, in diagrammatic form, an arrangement which is a variation of that shown in FIG. 1. Components of that variation which correspond to components of the FIG. 1 arrangement, will be given like reference numerals, but in the number series 100 to 199.

Insulating means 119 is provided between adjacent electrodes in the FIG. 3 arrangement, and passages for the material feeds 109 can be provided in some or all of those insulating means 119.

In the FIG. 3 arrangement, the control of the current distribution between the ring electrodes 102, 103, 104 and 118, is achieved by the use of appropriate switching means 113 which can operate at either a slow rate or at a rapid rate in comparison with the thermal times associated with the arc, or the material being treated by the device, so that the arc is kept in a substantially quasistatic condition. Initiation of the arc is effected by applying a suitable trigger voltage between the core electrode 101 and the adjacent ring electrode 102. During arc initiation, the electrode 102 is rendered active by connecting that electrode to the power source 111 with the respective switch means 113 in a closed position The respective switch means 113 connected to each of the other ring electrodes 103, 104 and 118, may be left in a closed or an open position depending on material/-gas flow conditions through the device. Immediately after arc initiation, the arc will burn between the core electrode 101 and the ring electrode 102.

After arc initiation, the arc can be transferred to burn between the core electrode 101 and any one of the other ring electrodes 103, 104 and 118, by closing the respective switch means 113 connected to the required ring electrode and opening the switch means 113 connected to the ring electrode 102. For example, to make the arc burn between the core electrode 101 and the ring electrode 104, the switch means 113 connected to the ring electrode 104 is closed and the switch means 113 connected to ring electrode 102 is then opened. The direction of gas flow through the device, the electrical conductivity of the hot gas, the voltage of the power source 111 and any overvoltages created by inductances in the system assist the arc transfer to the required ring electrode. In some applications, the extent of the change in the arc path length may be such that it is necessary to transfer the arc sequentially from an upstream ring electrode to an adjacent downstream electrode so as to guard against extinction of the arc.

The arc burning between the core electrode 101 and a ring electrode located in the downstream region of gas flow can be transferred back or retracted to a ring electrode located in a region upstream of the arcing electrode by closing the switch means connected to the new arcing electrode and if necessary, opening the switch means connected to the old, downstream, arcing electrode. For example, to transfer back or retract the arc from electrode 104 to the ring electrode 103, the switch means 113 connected to ring electrode 103 is closed; and the switch means 113 connected to ring electrode 104 may be opened or left closed depending upon the gas flow conditions.

Additional transfers and consequent extension or retraction of the arc column can be achieved in a device having more than three ring electrodes.

The switching between ring electrodes, either during extension, retraction, or sharing of the arc current, can be achieved in such a sequence as to produce a required current distribution within the arc. When the current distribution within the arc is varied, the distribution of power released in the arc varies thereby providing a means of controlling the arc power and its other properties such as temperature, pressure, etc.

The device can be operated in at least two basic modes of controlled operation. In one mode (termed for convenience as the slow mode of operation), the arc can be allowed to burn on any one of the ring electrodes for a duration (of approximately 0.1 second or longer), which is large in comparison with the thermal time constant of the arc, before it is transferred to any other ring electrode. This type of control provides a means to control the power of the arc in the device in a stepwise manner. It is to be understood, however, that the transfer of the arc from one ring electrode to another can be effected extremely rapidly by the use of electronic switching means even under the slow mode of operation. Suitable control of the power source can also be used in conjunction with the transfer of the arc between ring electrodes within the device. The transfer of the arc between electrodes within the device and the control of the power source can be linked to a higher level control to achieve a required power distribution and total power.

The second mode of operation (termed for convenience as the fast mode of operation) is effected by transferring the arc between all or only a few of the ring electrodes of the device at a rate rapid enough so that the dwell time of the arc at any particular ring electrode is smaller than the thermal time constant of the arc plasma. In this fast mode of operation, the power distribution and the power of the arc can be controlled by varying the dwell time of the arc on any particular ring electrode. In this case, the term dwell time of the arc on a ring electrode implies the duration of current flow from the arc to the ring electrode during one transfer. While operating in the fast mode of operation, the arc plasma in the device is near a quasi-static condition and the average current drawn by the electrodes and hence the average power of the arc are varied by varying the arc dwell times on the different ring electrodes of the device. It is to be understood that the power source can also be controlled in conjunction with the fast operation of the device.

The two modes described above represent the two extreme ways of switched operation which are substantially different. In the slow mode, the plasma properties (temperature, density, flow, speed, viscosity, etc.) change with the switching of the current path and control of the power distribution occurs in a time-averaged sense. The advantage of this mode is that altering conditions can be produced if desired which can be of advantage for the injection of powder into the arc, for example. In contrast to this, the fast mode essentially produces a quasi steady state of the plasma parameters and their distributions which can be changed by varying the dwell times as described.

It is to be understood that a static situation can also be achieved in the slow mode by using current control elements which allow the current to flow to the different electrodes at the same time continuously. A method by which this can be done without dissipative losses is a switched inductive circuit with free wheeling paths. This provides an impedance decoupling between the different electrodes and allows the arcs to burn stably in parallel.

The device can be operated under a variety of different modes of operation including a mode which makes use of the two basic modes of operation described above.

In yet another method of using the device, the rate of gas flow through the device is increased to supersonic level so that associated shock fronts or waves are produced. For an appropriately adjusted gas flow, rapid transitions between subsonic and supersonic flow conditions can be achieved by altering the electrical power input by way of a switching technique. In situations where the device is used for spraying materials to coat an object, shock fronts produced in the foregoing manner could be beneficial in producing thick and dense coatings.

Figure 4:
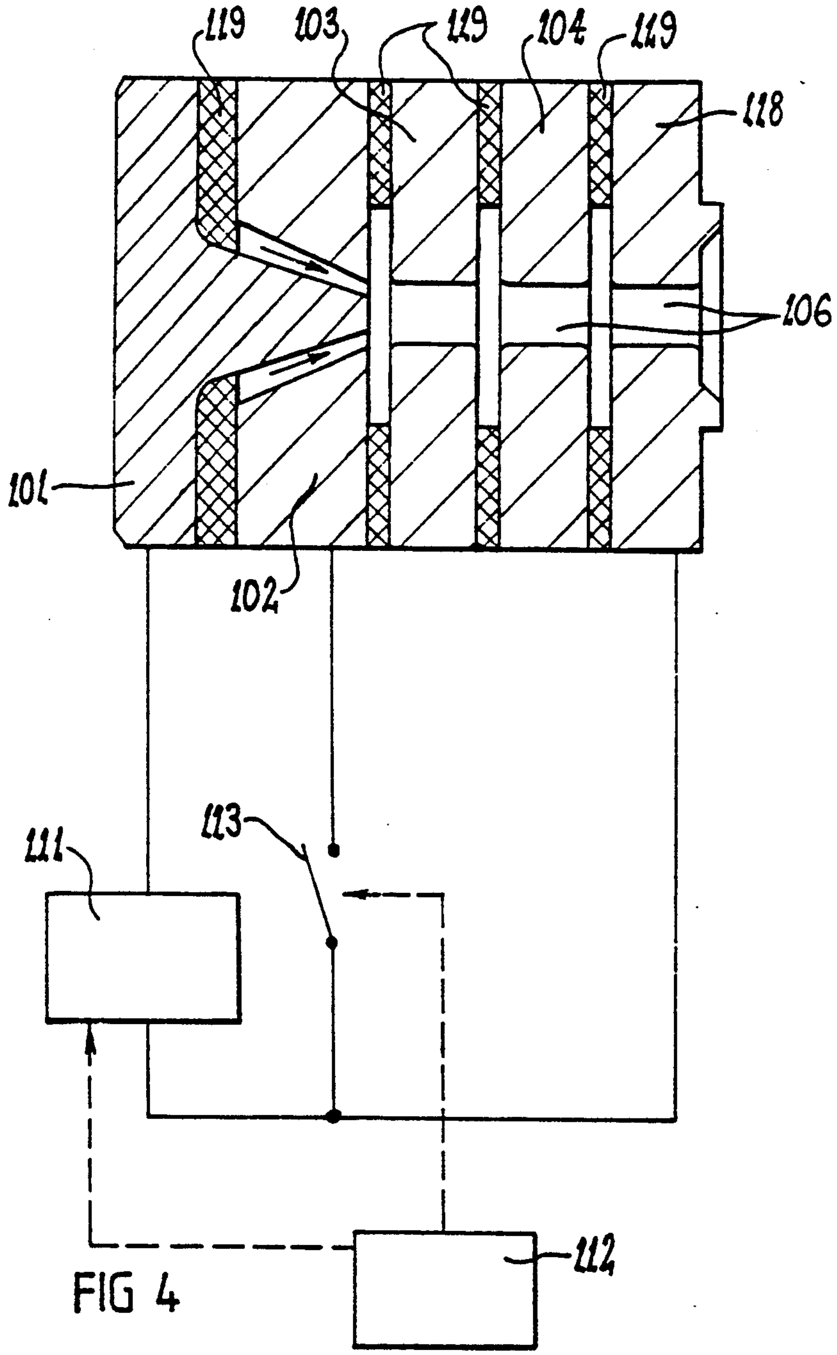
FIG. 4 is a diagrammatic representation of yet another embodiment of the invention.

FIG. 4 shows another embodiment of the invention which may be used to produce hot gas for material treatment or for use in surface treatment such as plasma spraying. Since the device shown in FIG. 4 is essentially the same as that shown in FIG. 3, the same reference numerals will be used.

The device shown in FIG. 4 has a number of coaxially arranged ring electrodes 102, 103, 104 and 118 separated from each other by suitable insulators 119. In this embodiment, only two of the ring electrodes, 102 and 118, are used to control the arc current distribution and the arc power distribution. This device uses only one switch means 113 to transfer the current from one ring electrode to the other. This device can be operated in both the slow and fast modes of operation. In the fast mode of operation, the arc is transferred between the two active ring electrodes 102 and 118 at a high frequency and the control of the arc power is effected by varying the ratio of the period during which the switch 113 remains closed to the period during which the switch 113 remains open. Using this type of control, for example, a feed-back control system to maintain the arc power at a required value can be built. Other types of feed-back control schemes to suit the application can also be built.

It will be apparent from the foregoing description that a device according to this invention extends the effectiveness and possible use applications of electric arc devices.

Various alterations, modifications and/or additions may be introduced into the constructions and arrangements of parts previously described without departing from the spirit or ambit of the invention.

We claim:

1. An electric arc generating device including, a first electrode, at least two further electrodes, supply means for connecting an electrical power source between said first electrode and any one or more of said further electrodes so as to cause an arc to be generated between said first electrode and a said further electrode, and control means which is operative to change the path of said arc between said first electrode and said further electrodes and thereby control the distribution of power within the arc zone, said change in arc path involving a series of changes in the length of the arc which includes both extension and reduction of the arc length, at least some of said changes in arc length involving a transfer of said arc from one said further electrode to another, said control means including electrical means which imposes an electrical influence on said arc path so as to thereby at least contribute to creation of said series of changes.

2. A device according to claim 1, wherein said electrical means controls the potential for each further electrode to attract attachment of a root of the arc and thereby influence the arc path.

3. A device according to claim 1 or 2, wherein said control means includes flow regulating means which is operative to regulate the rate at which gas and/or feed material flows through or across the arc zone and thereby influence the extent of said arc path.

4. A device according to claim 1, wherein said electrical means includes switching means which is operable to disconnect a selected said further electrode from said power source, or to connect a selected said further electrode to said power source, and to thereby change said arc path.

5. A device according to claim 1, wherein said control means is operable to adjust the current supplied to a said further electrode by said power source.

6. A device according to claim 5, wherein said control means is operable to selectively vary the current supplied to each said further electrode by said power source.

7. A device according to claim 1, claim, wherein each said further electrode is of substantially annular form and is arranged substantially coaxial with each other said further electrode, and a feed passage extends axially through said further electrodes and also through said first electrode.

8. A device according to claim 7, wherein at least part of said first electrode is of conical form and that conical part protrudes into the central opening of the adjacent said further electrode.

9. A device according to claim 1, wherein said first electrode constitutes a cathode, and each said further electrode constitutes an anode.

10. A method of operating an electric arc generating device having a first electrode and at least two further electrodes, including the steps of connecting an electrical power source to said electrodes so as to cause an arc to be generated between the first electrode one of said further electrodes, controlling the distribution of power within said arc by causing a series of changes in the length of the arc, said series including both i n and reduction of the arc length, at least some of said changes in arc length involving a transfer of said arc from one said further electrode to another, and at least contributing to the creation of said series of changes by modifying the influence of said power source on one or more of said further electrodes.

11. A method according to claim 10, wherein said control includes regulation of the rate of flow of gas or material through the zone of said arc.

12. A method according to claim 10 or 11, wherein said modification of the power source influence is effected at least in part by selectively disconnecting and reconnecting one or more of said further electrodes from and to respectively said power source so as to cause attachment of said arc to move from one said switchable electrode to another.

13. A method according to claim 12, wherein the time of each said disconnection and reconnection respectively is varied so as to control the arc power.

14. A method according to claim 13, wherein each period of time during which the arc remains attached to a said switchable electrode is less than the thermal time constant of the arc plasma or the material to be treated.

15. A method according to any one of claims 10 to 14, wherein the level of the current supplied to at least one said switchable electrode is controlled so as to control the extent and distribution of the arc power.

* * * * *